Dec. 7, 1937.  M. A. MARTIN  2,101,261
REFRIGERANT SYSTEM AND APPARATUS
Filed Sept. 24, 1935   2 Sheets-Sheet 2
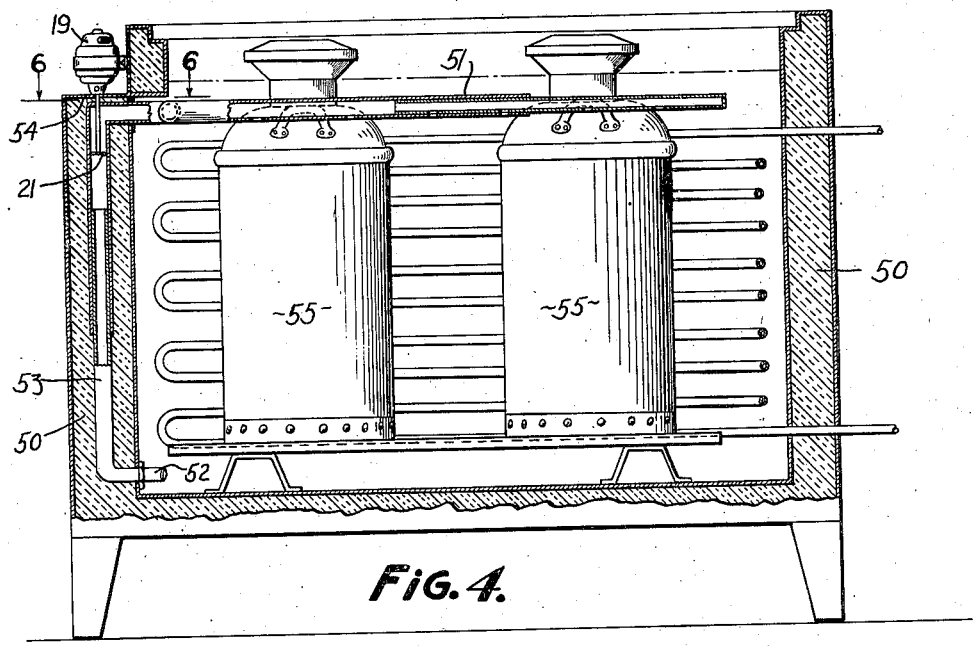
Fig. 4.
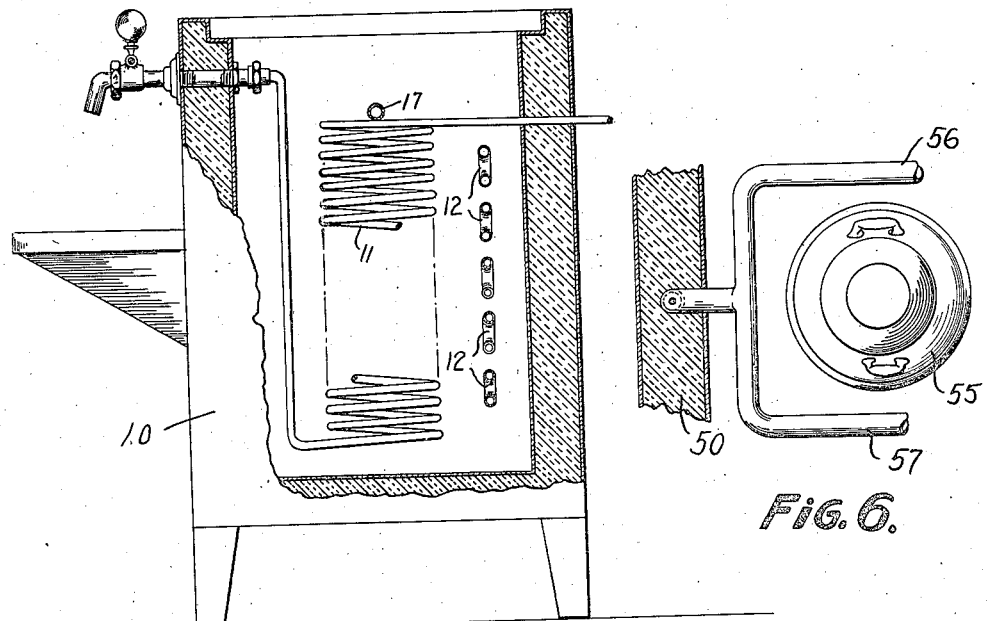
Fig. 5.
Fig. 6.
INVENTOR.
Michael A. Martin.
BY
His ATTORNEYS Patented Dec. 7, 1937

2,101,261

UNITED STATES PATENT OFFICE 2,101,261

REFRIGERANT SYSTEM AND APPARATUS

Michael A. Martin, Erie, Pa.

Application September 24, 1935, Serial No. 41,911

6 Claims. (Cl. 62—101)

This invention relates to refrigerant systems and apparatus embodying a liquid heat transfer agent, and more particularly to improved means effecting circulation of such heat transfer agent.

Prior refrigerant systems adapted primarily to cool liquids such as beer, milk, and the like, with which I am familiar, employ a heat insulated cabinet and a liquid container such as coils, tanks, or similar container disposed therein, through which the liquid to be cooled is forced or stored. The refrigerant means may comprise ice packed around the coils or container, or a refrigerant system such as the compressor-condenser type wherein an evaporator is disposed in a cabinet through which a volatile refrigerant fluid is forced by the compressor. In either case, for efficient operation, a heat transfer agent is necessary and which usually comprises water or an anti-freeze solution substantially immersing the container for the liquid to be cooled.

However, I find that the efficiency of both systems is considerably impaired due to the lack of circulation of the heat transfer agent. A system employing ice as the cooling means depends upon the water associated therewith to extract heat from the liquid passing through or stored in the container and transfer the same to the ice. In such a system, the relatively colder water will drop to the base of the cabinet and tend to remain there, rather than being continuously circulated, as is necessary for efficient cooling of the liquid.

However, when cooling beer or a similar beverage, which is withdrawn or dispensed at a rapid rate, the anti-freeze solution attains a higher temperature, causing the thermostat control to maintain the compressor operating for longer intervals or at an increased speed, resulting in a relatively cold temperature in the lower portion of the solution since the expansion of the refrigerant fluid normally takes place in the lower portion of the evaporator, and also due to the fact that the solution has a greater density in the lower portion thereof due to unsaturated salt such as calcium-chloride or the like. This frequently results in freezing the beer in the coils and consequently rendering the system inoperative and in some instances causing bursting of the coils.

Additionally, due to lack of circulation ice may form on the evaporator coils and also on the beverage coils, forming heat insulation and greatly impairing the efficiency of the system. Proper circulation of the liquid heat transfer agent would eliminate this ice formation, since it is well known that there is little tendency for a moving body of liquid to freeze except under extreme conditions of temperature and at a considerably lower temperature than the freezing temperature for a static body of the same liquid.

The cooling systems for milk usually comprise a heat insulated tank equipped with an evaporator adjacent one or more sides of the tank, and since the milk is to be cooled in cans rather than dispensed as in a cooling apparatus for beer, the usual practice is to form ice on the evaporator coils and place the cans of warm milk at substantially body temperature, or 96°, therein. An anti-freeze solution acts as the heat transfer agent between the evaporator and the milk.

However, a considerable period is required to lower the temperature of the milk to a desired point, such as 40°, due to the fact that a considerably greater number of heat units must be extracted from milk to lower its temperature a given amount than a similar amount of water, and secondly, due to the lack of circulation of the anti-freeze solution resulting in relatively warm solution surrounding the milk cans for a considerable period. This condition as to the time involved in cooling is particularly undesirable in milk since the bacteria count builds up rapidly at high temperatures, and the bacteria count can be minimized if the milk is quickly reduced to a desired low temperature.

I have devised a relatively simple forced system of circulation for the liquid heat transfer agent hereinbefore described, which requires relatively little power and which may be employed either with a packed-ice system or an automatic refrigerator system, and when used with an automatic system may operate only during periods when the compressor is operative, or may operate independently.

In employing such a system I effect a substantially constant temperature throughout the cabinet, preventing ice formation on the coils, increasing the efficiency of the refrigerant system generally, and eliminating the other conditions described effecting freezing of beer and bursting of the coil pipes.

Normally, in dispensing beer, it is withdrawn from the container after passing through a strata of relatively warm water, resulting in the beer being dispensed substantially at the temperature of this water. This temperature is higher than desired, since warm beer is relatively unpalatable, whereas if the beer were dispensed at the average temperature of the heat exchange liquid, as would be effected by proper circulation, it would be considerably more palatable.

Automatic refrigerant systems, such as those employing a volatile refrigerant fluid passing through an evaporator, may be thermostatically controlled and operate in a well known manner to effect a heat exchange between the liquid in the container and the evaporator through the medium of a liquid heat transfer agent. This heat transfer agent is usually an anti-freeze solution such as water and calcium-chloride or the like.

It is a primary object of my invention, therefore, to provide improved circulating means for a liquid heat transfer agent.

Another object of my invention is to provide means in a refrigerant system for beverages whereby the temperature of the beverage is maintained more nearly uniform in a given interval than in prior systems with which I am familiar.

Another object of my invention is to provide improved means effecting circulation of a liquid heat transfer agent in a refrigerant system, thereby increasing the efficiency of the system, whereby a relatively smaller unit may be employed.

Another object of my invention is to provide improved circulating means for a liquid heat transfer agent in a refrigerant system whereby the formation of ice on the refrigeration evaporator will be prevented.

Another object of my invention is to provide an apparatus effecting circulation of a liquid heat transfer agent in a refrigerant system adapted to either an ice system or an automatic mechanical system, and which is adjustable to accommodate cabinets of varying dimensions.

Other objects of my invention and the invention itself will become increasingly apparent from a consideration of the following description and drawings, wherein:

Fig. 4 is a sectional elevational view showing my invention incorporated in an automatic refrigerant system adapted to cool milk or similar fluids; and Fig. 5 is a sectional view taken along the line 5—5 of Fig. 1; and Fig. 6 is a fragmentary view taken along the line 6—6 of Fig. 4.

Figure 1:
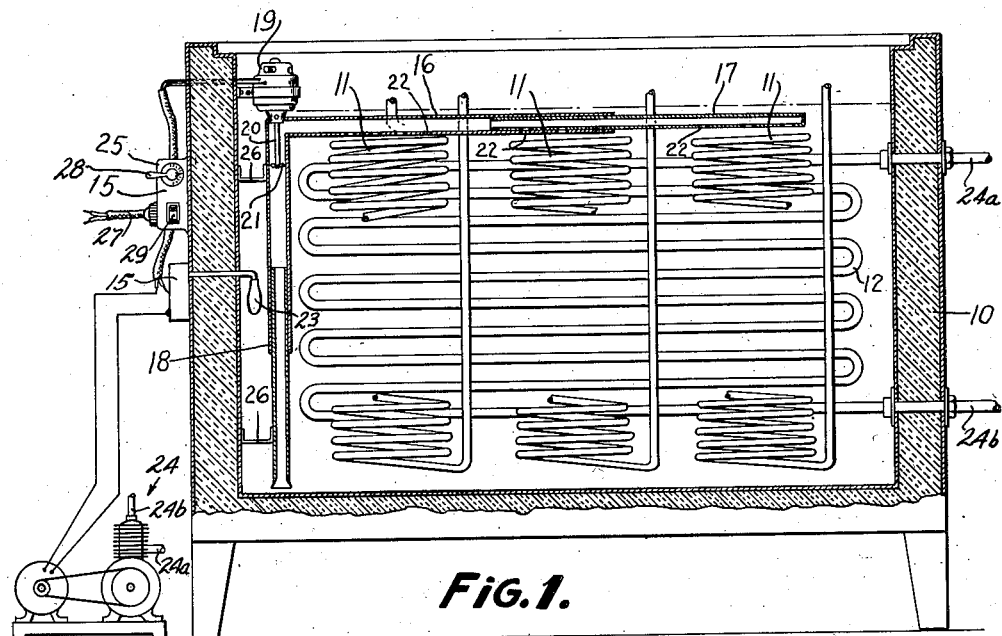
Fig. 1 is a sectional elevational view, showing my invention incorporated in an automatic refrigerant system associated with a beer or similar beverage dispensing apparatus.

Referring now to the drawings, and particularly to Fig. 1, I have indicated generally at 10 a conventional heat insulated cabinet and at 11 a plurality of coils, such as three, adapted to have beer or a similar beverage forced therethrough from a source of supply disposed externally of the cabinet 10, and withdrawn after being cooled by passage through the coils by a faucet or similar means. The manner of circulating beer, water, or other liquid through the coils is well known in the art and constitutes no essential part of my invention.

A unit commonly termed an evaporator is generally indicated at 12, and comprises a plurality of generally parallel interconnected coils through which a volatile refrigerant fluid is forced by means of a compressor disposed externally of the cabinet.

The evaporator 12 is preferably placed adjacent the back wall of the cabinet and in addition to the compressor is connected in circuit with a condenser and expansion valve in the usual manner.

The beverage coils 11 and the evaporator 12 are preferably immersed by an anti-freeze solution such as water and calcium-chloride, which effects a heat exchange between the coils and the evaporator and acts as a hold-over or heat storage medium during intervals when the compressor is not operating. As previously explained, the anti-freeze solution usually has a greater density in the lower portions of the cabinet and due to this factor, and the fact that liquid refrigerant entering the lower portion of the cabinet is quickly volatilized, the greatest heat exchange takes place in the lower portions of the cabinet, and the anti-freeze solution is relatively colder at this point. The warmer portion of the solution remains closest to the surface in the conventional systems, and little or no circulation is effected. This lack of circulation, as previously pointed out, may result in ice forming on the evaporator and beverage coils with resultant freezing of the beer and probable bursting of the coils, and even if this does not occur the efficiency of the system is impaired by the lack of circulation since the temperature of the upper strata of the anti-freeze has to be maintained substantially at the temperature or slightly lower than the withdrawal temperature of the beer, thus maintaining the lower portion of the solution several degrees colder.

The operation of the compressor may be controlled in the usual manner by a thermostatic switch, generally indicated at 15, which is operably responsive to changes of temperature of a capillary tube 23 immersed in the anti-freeze solution. The tube is usually disposed adjacent the surface of the anti-freeze solution since the governing factor is the withdrawal temperature of the beer or beverage, and which is substantially that of the anti-freeze solution at the surface. The compressor unit generally indicated at 24 is connected to the evaporator 12 by the usual refrigerant fluid supply and return lines 24a and 24b, the lines being shown broken for convenience in illustrating. Thermostatic switches are well known and the switch 15 illustrated controls energizing of the compressor circuit from the power leads indicated at 27 and concurrently the circuit for a circulator to be hereinafter described. Gas pressure in tube 23 at a pre-determined temperature effects movement of a bellows or the like and an associated electrical contact to close the circuit and at a pre-determined lower temperature contracting movement of the bellows opens the circuit. The temperature limits at which the switch operates may be adjusted by movement of a handle 28.

To effect circulation of the anti-freeze solution and maintain a substantially even temperature throughout the cabinet and a rapid exchange of heat between the beverage coils and the evaporator, I provide an apparatus called a circulator and generally indicated at 16.

The circulator comprises interconnected horizontal and vertical leg portions, indicated at 17 and 18 respectively. Both the horizontal portion 17 and the vertical portion 18 are telescopicable, whereby their lengths may be varied to accommodate cabinets of varying size. A motor, generally indicated at 19, is rigidly mounted on the circulator in any suitable manner as by providing an upward extension of the vertical portion 18 and securing the motor thereto, with the motor shaft 20 projecting downwardly into the vertical portion 18.

An impeller 21 is rigidly secured to the end of the shaft 20. The motor 19 may be of relatively small horse-power since the impeller 21 does not have to lift liquid against any appreciable head, but merely to effect circulation of the same. It is understood that suitable packing or other means will protect the motor parts from liquid which might penetrate thereinto, and the motor may be mounted in this instance above the liquid level.

The anti-freeze solution will be drawn upwardly through the vertically extending portion 18 of the circulator conduit and discharged adjacent the surface of the liquid through the horizontally disposed conduit portion 17. To effect the discharge of solution through the conduit portion 17 I provide a plurality of holes 22 preferably on the underside of the conduit portion 17, these holes being sufficiently numerous and so spaced as not to interfere with the telescoping arrangement.

The motor 19 is controlled by a switch, generally indicated at 25, and which may be controlled jointly with the compressor by means of the thermostatic arrangement whereby the motor will be operative only during operative periods of the compressor, which is a preferred arrangement since the maximum refrigerating effect will take place during operation of the compressor. It is necessary to effect circulation of the anti-freeze solution since the tendency for the beer to freeze and other difficulties previously mentioned will be greatest at this time. However, it is not necessary that the motor be controlled concurrently with the compressor, and the switch 25 may be manually controlled rather than thermostatically, as desired by manipulation of a button 29.

The circulator may be supported in any suitable manner, and in the embodiment described I provide generally channel-shaped clips 26 integrally secured to the vertically extending portion 18 of the conduit by soldering or the like, and secured to a wall of the cabinet by screws or similar means. I preferably secure the clips 26 to relatively telescopical portions of the conduit 18, permitting adjustment to cabinets of varying heights, and I preferably position the circulator so that the horizontally extending portion 17 passes over the central portion of each of the coils 11, whereby the relatively cold solution forced upwardly from adjacent the cabinet base will pass through the perforations provided in the conduit portion 17 to relatively cool and effect circulation of the warmer solution in the upper portion of the cabinet.

Although I have shown this embodiment of my invention as adapted to an automatic refrigerant system for beer, it is understood that it may be utilized with ice-pack systems and for cooling other liquid than beer.

Figure 2:
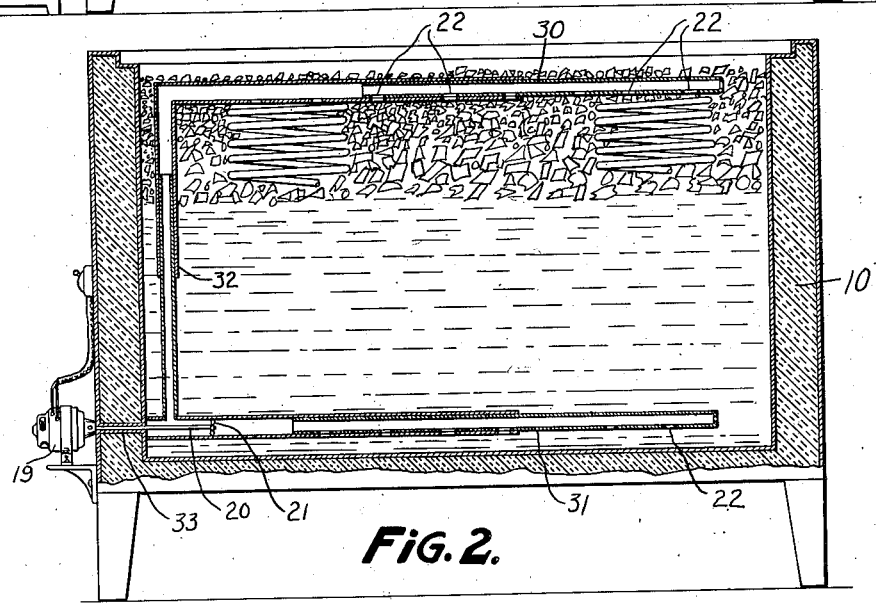
Fig. 2 is a sectional elevational view showing my invention embodied in a beer or similar beverage dispensing apparatus, wherein ice is employed as the cooling means.

Referring now to Fig. 2, I have illustrated another embodiment of my invention generally similar to that illustrated in Fig. 1, but adapted to ice as the refrigerating agent, and the position of the motor 19 is changed.

In this modification, the conduit is generally U-shape, comprising an adjustable horizontally extending upper portion 30, an adjustable horizontally extending lower portion 31 interconnected by an adjustable vertically extending portion 32. The portion 30 is provided with a plurality of perforations 22 for a purpose previously described, and the lower conduit portion 31 may also be provided with a plurality of perforations to effect a more uniform circulation.

A motor 19 in this instance is disposed horizontally and rigidly affixed to an external wall of the cabinet with the motor shaft 20 extended through the insulation of the cabinet and projected into the lower conduit portion 31. Any suitable bearing and seal may be provided at 33 to prevent leakage around the motor shaft 20.

Figure 3:
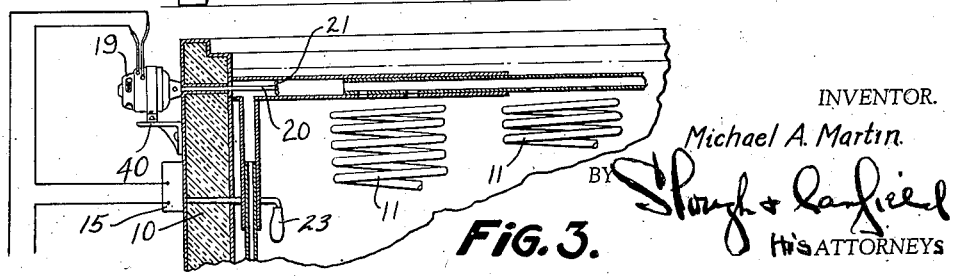
Fig. 3 is a view generally similar to Fig. 1, showing a modification of my invention incorporated in a beverage dispensing and cooling apparatus employing an automatic refrigerant system.

Fig. 3 illustrates another embodiment of my invention, generally similar to that illustrated in Fig. 1, but wherein the motor 19 is disposed externally of the cabinet and supported by a bracket or the like 40 affixed to the cabinet wall, the shaft 20 projecting through the wall insulation and mounted in a manner similar to that described in connection with the embodiment of Fig. 2. In this modification the circulator circuit is controlled by a thermostatic switch 15 previously described and the compressor operation may be controlled independently of the circulator by a conventional switch responsive to refrigerant fluid pressure.

Referring to Fig. 4, I have illustrated another modification of my invention generally similar to those described but adapted primarily to cooling milk. In this modification the cabinet is provided with suitable heat insulation 50 such as cork or the like, the circulator tube being generally U-shaped. The circulator tube comprises adjustable horizontal upper and lower portions 51 and 52 respectively interconnected by an adjustable vertical portion 53 disposed within the insulation.

The motor 19 is preferably mounted on a shelf 54 provided on the cabinet and operates as previously described to actuate the impeller 21 and effect circulation through the U-shaped tube arrangement. Encasing the vertical portion 53 of the tube in the insulation minimizes any loss of heat by radiation.

The cans containing milk or the like are indicated at 55 and to effect a uniform circulation therearound I preferably construct the tube portion 51 of bifurcated form, as indicated in Fig. 6, to provide similar perforated portions 56 and 57 at each side of the cans.

In this modification, I preferably extend the evaporator along three sides of the cabinet to effect a rapid reduction in the milk temperature supplementing the circulating effect and minimizing any tendency to increase the bacteria content.

It is understood that lateral feeders or distributing outlets may be used with the horizontally extending portions in the various modifications if desired, and the ends of such portions may be either entirely closed or restricted.

Although I have described the heat exchange liquid as circulating from bottom portions of the cabinet upwardly through the tube, it is understood that the direction of circulation may be reversed and the heat exchange liquid caused to flow downwardly through the tube from top portions of the cabinet to lower portions.

Although I have shown and described modifications of my invention, I contemplate that numerous and extensive departures may be made therefrom without departing from the spirit of my invention and the scope of the appended claims.

I claim:

1. The combination with a single heat insulated cabinet, a liquid container in the cabinet, means for cooling said container comprising a liquid heat transfer agent substantially immersing the container, of means effecting circulation of the heat transfer liquid comprising a tube of a substantially uniform diameter having an open end adjacent the cabinet base and a perforated horizontally extending portion immersed by said heat exchange liquid, and disposed a substantial distance upwardly from the cabinet base, and motor operable impeller means within the tube whereby the heat exchange liquid may be circulated through the tube from one portion of the cabinet to another portion, to maintain a substantially uniform temperature of the heat exchange liquid throughout the cabinet.

2. The combination as described in claim 1, and wherein said tube is horizontally and vertically adjustable to accommodate varying sizes of cabinets.

3. The combination with a single heat insulated cabinet, liquid containing means in the cabinet, automatic refrigerating means comprising an evaporator disposed in the cabinet and a compressor disposed externally thereof, liquid heat transfer means substantially immersing the liquid container, means effecting circulation of the heat transfer liquid comprising a tube having an open end adjacent the cabinet base and a perforated horizontally extending portion normally immersed by said heat transfer liquid, impeller means projected within the tube whereby liquid will be continuously circulated through the tube to maintain a substantially uniform temperature of the heat transfer liquid throughout the cabinet, and a common switch means controlling actuation of the compressor and impeller responsive to temperature of the heat exchange liquid.

4. The combination with a single heat insulated cabinet, a liquid container in the cabinet, means for cooling said container comprising a liquid heat transfer agent substantially immersing the container and normally of a lower temperature in the lowermost zone of the cabinet, means effecting circulation of the heat transfer liquids comprising a tube having an open end adjacent the cabinet base and a perforated horizontally extending portion immersed by said heat exchange liquid and adjacent to the liquid surface, a motor operable impeller projected within the tube and substantially rotatably engaging the inner walls of the tube, a rotary shaft inter-connecting the motor and the impeller of a length comprising a minor portion of its associated tube length, and an evaporator within the cabinet adapted to maintain the temperature of the heat transfer liquid below a predetermined value.

5. The combination with a single heat insulated cabinet, a liquid container in the cabinet, and means for cooling said container comprising a liquid heat transfer agent substantially immersing the container, of means effecting circulation of the heat transfer liquid comprising a tube of substantially uniform diameter having perforated horizontally and vertically extending portions, the perforations in one portion being adjacent the cabinet base and in the other portion being adjacent to but beneath the level of the liquid heat transfer agent, the vertical tube portion being adjustable to accommodate cabinets of varying heights, and motor operable impeller means within the tube whereby the heat exchange liquid may be circulated through the tube from one portion of the cabinet to another portion to maintain a substantially uniform temperature of the heat exchange liquid throughout the cabinet.

6. The combination with a single heat insulated cabinet, a liquid container in the cabinet and means for cooling said container comprising a liquid heat transfer agent substantially immersing the container, of means effecting circulation of the heat transfer liquid comprising a vertically extending tube of substantially uniform diameter, the tube extending for a major portion of the depth of the heat transfer agent and being immersed thereby, each end of the tube being open to circulate liquid, motor operable impeller means within the tube whereby the heat exchange liquid may be circulated through the tube from one portion of the cabinet to another portion to maintain a substantially uniform temperature of the heat exchange liquid throughout the cabinet, and a thermostatic switch controlling operation of the impeller motor responsive to temperature of the heat exchange liquid in a given portion of the cabinet.

MICHAEL A. MARTIN.